Patented Mar. 27, 1951

2,546,586

UNITED STATES PATENT OFFICE 2,546,586

CORROSION PREVENTION

Walter M. Cross, Jr., Kansas City, Mo., assignor to Kansas City Testing Laboratory, Kansas City, Mo., a corporation of Missouri No Drawing. Application January 28, 1946, Serial No. 643,967

8 Claims. (Cl. 166—21)

This invention relates to methods of preventing corrosion and more particularly relates to the prevention of the action of corrosive waters on metal equipment.

In the present art of producing oil from underground formations corrosion of steel pipes, steel tubing and equipment by corrosive formation waters causes much loss of production and requires a large amount of expensive well repair work. Corrosive waters also cause much difficulty in brine circulating systems, heat exchangers and the like. In the production of oil, corrosion of steel and metal equipment is caused by the acidic action of certain types of sulphur bearing waters and subterranean brines. Usually these brines have a hydrogen ion concentration (pH) below 8 and in such conditions corrode steel pipe and equipment.

An object of this invention is to prevent such corrosion in oil field and other equipment. Another object of this invention is to furnish a material for the treatment of oil wells and metal equipment subject to corrosive action. Another object of this invention is to supply an easy means of applying the material to oil wells to secure a corrosion protection effect which lasts for a considerable length of time.

It has been generally conceded in the art that if a hydrogen ion concentration (pH) of at least 8 can be maintained, corrosion of steel parts will be prevented. It has also been accepted that if the pH of the brine rises to a high value, hydrolysis will again take place. This makes the use of stronger alkalies impractical. In the practice of this invention, a mildly soluble alkaline material is used which is slowly soluble in water and which has a self-limiting characteristic in raising the pH of brines. In other words, materials are used which will obtain a desirable maximum pH in brine water due to the fact that the pH of the saturated solution of the mildly soluble material does not rise above the desirable value.

In order to treat pumping oil wells it is necessary to have a material in the form of particles or aggregate which will be heavy enough to stay at the bottom of the well and which will not be pumped into the tubing with the oil and water. The material should be in such form as to be conveniently placed in the well through the casing head even while the well is operating. To accomplish the purpose of this invention a material such as hydrated lime is mixed with a material capable of setting, such as plaster of Paris or cement. Binder material preferably has a solubility in water and brine approximating that of the alkaline material which is used to raise pH. Such a material when properly manufactured gives an alkaline reaction to methyl orange indicator when allowed to stand in the water being treated.

It is necessary to have the proportion of binder material to the total weight of material used high enough to produce a sound product. If an alkaline material too soluble in water is used, the product will crumble upon immersion in water even though it sets up as a sound lump in air. One example of the practice of this invention is as follows: 60 parts of plaster of Paris are mixed with 40 parts of hydrated lime and hydrated with the proper amount of water. The slurry is poured into a mold of suitable form and the mixture is allowed to set. The result is a pellet or lump of material which raises the pH of brine water. In the example of the invention, it will be noted that the solubility of calcium hydroxide varies from 0.185 gram per 100 cubic centimeters of cold water to 0.077 gram per 100 cubic centimeters of water at 100° C. and that plaster of Paris has a solubility of 0.241 gram per 100 c. c. of water at 0° C. and of 0.222 gram per 100 c. c. of water at 100° C. The solubility of the binder material is just slightly more than the solubility of the alkaline material. While the plaster of Paris is very slightly alkaline, it is not of sufficient alkalinity to neutralize most brine water encountered in oil production.

The material described above may be dropped into the casing of an oil well in the annular space between the casing and the tubing and it will fall to the bottom of the well. A sufficient amount of pellets is placed in the well to last for a desired length of time. It is best to wet the pellets prior to dropping them into the oil well in order to prevent them from becoming coated with oil and thus have the solution rate decreased. This material raised the pH of a certain oil well brine from pH 6.4 to pH 8.6 and prevented corrosion of the tubing in the well. It was found that this water required 0.0464 pound of hydrated lime per barrel of water. The well was treated with sufficient lime to maintain the pH above 8 for a period of 30 days.

An improvement in this product consists of mixing with the alkaline material and the binder a cellular type of material such as diatomaceous earth. The cellular material insures the complete penetration of the pellet by water. The formula for this type of pellet is as follows:

| | Parts |
|---|---|
| Plaster of Paris | 55 |
| Diatomaceous earth | 5 |
| Hydrated lime | 45 |

Formulae of this type are good practice but are limited only by the requirement that there be enough binder present to maintain the particle in pellet form upon immersion in water. Other samples of mildly soluble alkaline material which are used are sodium metaphosphate, potassium metaphosphate, naturally reactive limestone, magnesite, brucite, dolomite and certain types of slag.

When it is convenient to do so a gravel pack of corrosion preventive pellets is put into the bottom of the well at the time when the tubing is removed from the well for repair purposes. This pack has not only the advantage of preventing corrosion but also prevents the influx of sand from the producing formation.

Another modification of this invention is to take care of water influent to an oil well from a formation above the oil producing formation. In many instances it has been found that waters will corrode holes in the casing of an oil well. The level of this influent usually stays at some point considerably above the bottom of the well since its rate of flow is often too great to pump off each day. In order to secure treatment of this water at its level of entry, corrosion preventing pellets are made to have the characteristic of floating on water. The principal requirement for such a pellet is that there shall be sufficient occluded gas in the pellet to enable it to float. Such pellets may be made by the following formula as an example:

| | Parts |
|---|---|
| Portland cement | 55 |
| Hydrated lime | 45 |
| Diatomaceous earth | 5 |
| Powdered aluminum | 2 |
| Sodium hydroxide | 3 |

The above mixture is thoroughly mixed, quickly hydrated, and placed into molds. Hydrogen is released from the alkaline material and numerous small bubbles are occluded in the mixture. Upon setting the mixture becomes hard but floats on water. It is desirable to use caustic soda and aluminum in their combining proportions in this example.

In many oil wells it has been found that corrosion takes place at certain levels in the producing string of tubing. In one field, wells producing from 3500 feet show corrosion almost invariably at a level of between 500 and 600 feet from the surface. In such cases, this invention is valuable by making a cell containing the acid neutralizing pellets which is set into the production tubing at the desired level in the well. The influent in the tubing is caused to have a pH of at least 8 by this means and corrosion is prevented. Sometimes it is desirable to place a cell of the corrosion preventing pellets at the bottom of the production string either above or below the working barrel.

Portland cement and plaster of Paris have been used as binders in examples shown but other binders may be used. It has also been found that certain slowly soluble sodium silicates give the desired but self-limited pH increase.

While disclosure of this invention has mainly been made with reference to oil wells, where it is of great value, it will readily be seen that it will apply to many instances where pH control is desirable. It can be placed into a system without the requirement of bagging or special dissolving devices and forms a method of self-limiting, pre-determined pH control of waters. Examples of other uses of treatment are refrigerator brines, treatment of cool water spray ponds, treatment of water in condensers and related applications.

Having described the invention, what is claimed is:

1. A porous, slightly soluble solid pellet for inhibiting the corrosive action of corrosive oil well waters by raising the pH of said waters to at least 8 upon contact therewith which comprises about 55 parts by weight of plaster of Paris, about 45 parts by weight of hydrated lime and about 5 parts by weight of diatomaceous earth.

2. A porous, slightly soluble solid pellet adapted to float on the surface of and to inhibit the corrosive action of corrosive oil well waters by raising the pH of said waters to at least 8 which comprises about 55 parts by weight of Portland cement, about 45 parts by weight of hydrated lime, about 5 parts by weight of diatomaceous earth, about 2 parts by weight of powdered aluminum and about 3 parts by weight of sodium hydroxide.

3. The method of preventing corrosion of metal by corrosive liquids which comprises bringing said liquids into contact with a slightly soluble solid material consisting essentially of an inorganic slightly soluble acid neutralizing material and an inorganic hydrosetting cementitious binding material, said solid material being in the form of pellets in which said acid neutralizing material is uniformly distributed, the acid neutralizing material being effective to produce a pH of at least 8 when said pellets are added to water.

4. A method for treating oil wells to prevent the corrosive action of water on metal parts which comprises dropping into the well through the annular space between the production tubing and the casing, slowly dissolving partially water soluble pellets consisting essentially of an inorganic solid, slightly water soluble acid neutralizing material and an inorganic hydrosetting cementitious binding material containing an amount of gas sufficient to cause said pellets to float on water, said pellets being capable of raising the pH of water in the well to a value of at least 8.

5. The method of inhibiting the corrosive action of corrosive oil well waters by raising the pH of said waters to at least 8 which comprises contacting said waters with a quantity of a slightly soluble solid material consisting essentially of hydrated lime and plaster of Paris, said solid material being in the form of pellets in which said hydrated lime is uniformly distributed, said pellets being effective to produce a pH of at least 8 when they are added to water.

6. The method of inhibiting the corrosive action of corrosive oil well waters by raising the pH of said waters to at least 8 which comprises contacting said waters with a porous, slightly soluble solid material consisting essentially of a major proportion of material of the group consisting of plaster of Paris and Portland cement, a minor proportion of hydrated lime and a small amount of diatomaceous earth, said solid material being in the form of pellets in which the hydrated lime and diatomaceous earth are uniformly distributed, the pellets being effective to produce a pH of at least 8 when they are added to water.

7. The method of inhibiting the corrosive action of corrosive oil well waters by raising the pH of said waters to at least 8 which comprises contacting said waters with a porous, slightly soluble solid material consisting essentially of about 55 parts by weight of plaster of Paris, about 45 parts by weight of hydrated lime and about 5 parts by weight of diatomaceous earth, said solid material being in the form of pellets in which the hydrated lime and diatomaceous earth are uniformly distributed, the pellets being effective to produce a pH of at least 8 when they are added to water.

8. The method of inhibiting the corrosive action of corrosive oil well waters by raising the pH of said waters to at least 8 which comprises contacting said waters with a porous, slightly soluble solid material adapted to float on the surface of said waters consisting essentially of about 55 parts by weight of Portland cement, about 45 parts by weight of hydrated lime, about 5 parts by weight of diatomaceous earth, about 2 parts by weight of powdered aluminum and about 3 parts by weight of sodium hydroxide, said solid material being in the form of pellets in which the hydrated lime, diatomaceous earth, powdered aluminum and sodium hydroxide are uniformly distributed, the pellets being effective to produce a pH of at least 8 when they are added to water.

WALTER M. CROSS, Jr.

REFERENCES CITED

The following references are of record in the file of this patent:

UNITED STATES PATENTS

| Number | Name | Date |
|---|---|---|
| 785,312 | Langley | Mar. 21, 1905 |
| 1,531,992 | Speller | Mar. 31, 1925 |
| 1,739,460 | Hinton | Dec. 10, 1929 |
| 1,829,381 | Walter | Oct. 27, 1931 |
| 1,829,705 | Walker | Oct. 27, 1931 |
| 1,873,084 | Walker | Aug. 23, 1932 |
| 1,997,256 | Hall | Apr. 9, 1935 |
| 2,038,956 | Parkhurst | Apr. 28, 1936 |
| 2,045,335 | Reynolds | June 23, 1936 |
| 2,190,989 | Johnston | Feb. 20, 1940 |
| 2,219,416 | French | Oct. 29, 1940 |
| 2,288,557 | Vollmer | June 30, 1942 |
| 2,385,175 | Berkeley et al. | Sept. 18, 1945 |

FOREIGN PATENTS

| Number | Country | Date |
|---|---|---|
| 224,802 | Great Britain | Nov. 20, 1924 |
| 531,469 | Great Britain | Jan. 6, 1941 |
| 730,011 | France | May 3, 1932 |

OTHER REFERENCES

Stericker: Sodium Silicates in Water to Prevent Corrosion, Bulletin No. 372 of Philadelphia Quartz Co. of Philadelphia, Pa., 10 pages (reprint of article in Industrial and Engineering Chem., vol. 30, page 348, et seq. Mar. 1938).